(12) United States Patent
Clements et al.

(10) Patent No.: US 10,352,740 B2
(45) Date of Patent: Jul. 16, 2019

(54) SENSING TIP RETENTION

(71) Applicant: Microsoft Technology Licensing, LLC, Redmond, WA (US)

(72) Inventors: Bradley E. Clements, Ft. Collins, CO (US); Xiaoyue Xie, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 194 days.

(21) Appl. No.: 15/439,804

(22) Filed: Feb. 22, 2017

(65) Prior Publication Data
US 2018/0238721 A1   Aug. 23, 2018

(51) Int. Cl.
*G01D 11/30*  (2006.01)
*G06F 3/0354* (2013.01)

(52) U.S. Cl.
CPC ......... *G01D 11/30* (2013.01); *G06F 3/03545* (2013.01)

(58) Field of Classification Search
CPC ...... G01D 11/30; G01R 1/067; G06F 3/03545
See application file for complete search history.

(56) References Cited

U.S. PATENT DOCUMENTS

| | | | |
|---|---|---|---|
| 4,513,437 A | 4/1985 | Chainer et al. | |
| 4,585,364 A | 4/1986 | Liaw | |
| 4,672,154 A | 6/1987 | Rodgers et al. | |
| 5,461,204 A * | 10/1995 | Makinwa | G06F 3/046 178/19.03 |
| 5,481,949 A * | 1/1996 | Yen | B25B 23/0035 279/24 |
| 5,850,059 A | 12/1998 | Yoshimura | |
| 6,188,392 B1 | 2/2001 | O'Connor et al. | |
| 7,528,825 B2 | 5/2009 | Sakurai et al. | |
| 2005/0279231 A1 | 12/2005 | Lee | |
| 2006/0069307 A1* | 3/2006 | Boulais | A61B 1/00128 600/132 |
| 2006/0233591 A1 | 10/2006 | Dietz | |
| 2011/0038659 A1 | 2/2011 | Andochick | |
| 2011/0227880 A1 | 9/2011 | Liang et al. | |
| 2014/0333590 A1 | 11/2014 | Hirata et al. | |
| 2015/0070330 A1 | 3/2015 | Stern | |

(Continued)

FOREIGN PATENT DOCUMENTS

| | | |
|---|---|---|
| CN | 103513792 A | 1/2014 |
| CN | 203838657 U | 9/2014 |
| CN | 204129101 U | 1/2015 |

OTHER PUBLICATIONS

"Executive Stylus Tip Twist Pen Kit", https://www.pennstateind.com/library/PKEXECSTXX_INS.pdf, Retrieved on: Dec. 13, 2016, 2 pages.

(Continued)

*Primary Examiner* — Mark Edwards
(74) *Attorney, Agent, or Firm* — Rainier Patents, P.S.

(57) ABSTRACT

The description relates to devices having sensing tips and releasably retaining the sensing tips. One example includes a tip holder that defines a cavity that receives the sensing tip. This example also includes first and second clamps positioned radially around the tip holder and extending through holes in the tip holder into the cavity to contact the sensing tip. The example further includes a flexible clamp band positioned around the first and second clamps and biasing the first and second clamps inwardly against the sensing tip.

20 Claims, 4 Drawing Sheets

(56) References Cited

U.S. PATENT DOCUMENTS

2015/0138165 A1     5/2015  Hinson
2015/0378456 A1    12/2015  Ho et al.
2016/0195942 A1     7/2016  Chen et al.
2016/0348813 A1*   12/2016  Gaillard .............. F16L 19/0206

OTHER PUBLICATIONS

"International Search Report and Written Opinion Issued in PCT Application No. PCT/US2018/018573", dated May 16, 2018, 10 Pages.

* cited by examiner

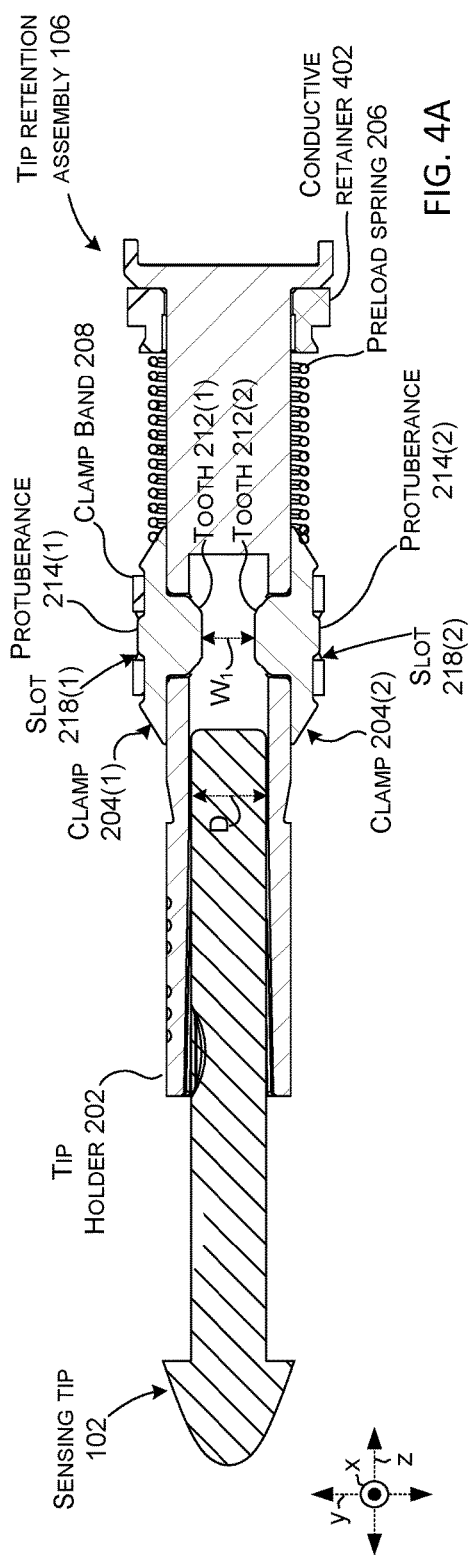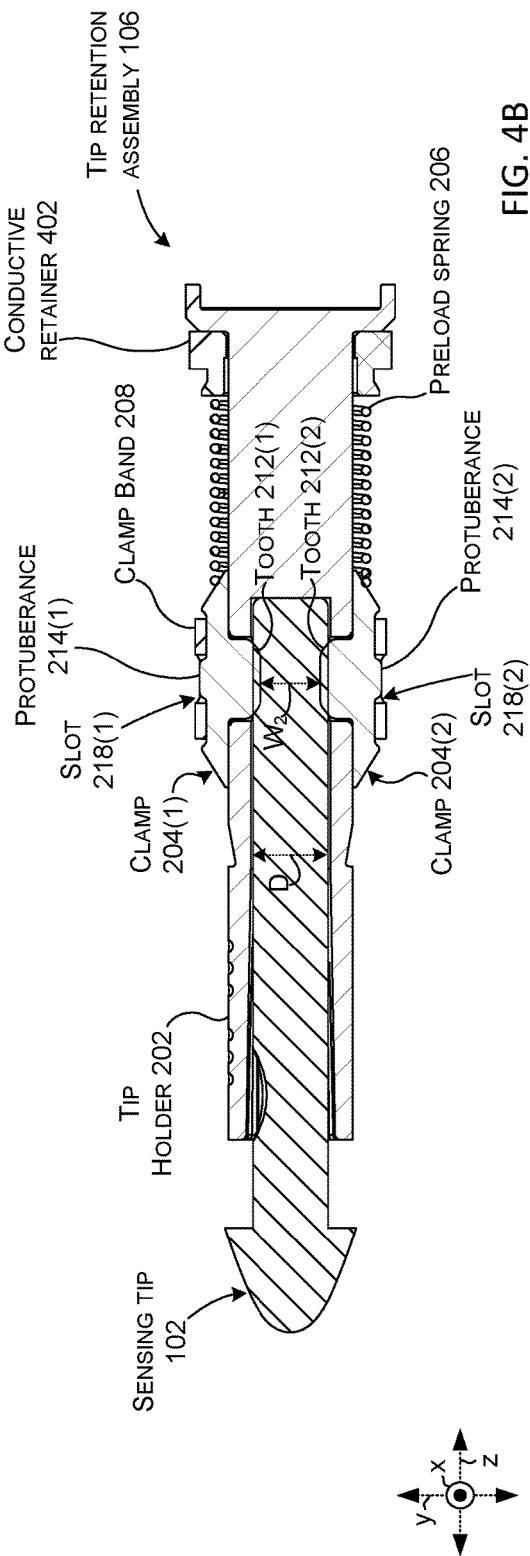

SENSING TIP RETENTION

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

FIGS. 4A and 4B are sectional views of a tip retention assembly example in accordance with some implementations of the present concepts.

DESCRIPTION

The present concepts relate to graspable electronic devices that have sensing tips that allow a user to interact with another device, such as a tablet or phone. An electronic stylus or digital pen is a common example of a graspable electronic device. The sensing tip can sense information that can then be communicated to electronic components in the digital pen. Sensing tips can wear out and/or be damaged. Also, individual sensing tips can have different properties. For instance, one sensing tip might be narrow and be designed for writing, while another sensing tip is broader and is designed for drawing. The present concepts relate to tip retention assemblies that physically releaseably retain the sensing tip and electronically connect the sensing tip to electronic components in the pen body. The user can readily remove the sensing tip and insert a new sensing tip. The tip retention assemblies can offer economical designs that provide consistent mechanical retention and reliable electrical contact between the sensing tip and electronic components in the pen body over the lifetime of the digital pen.

Figure 1:
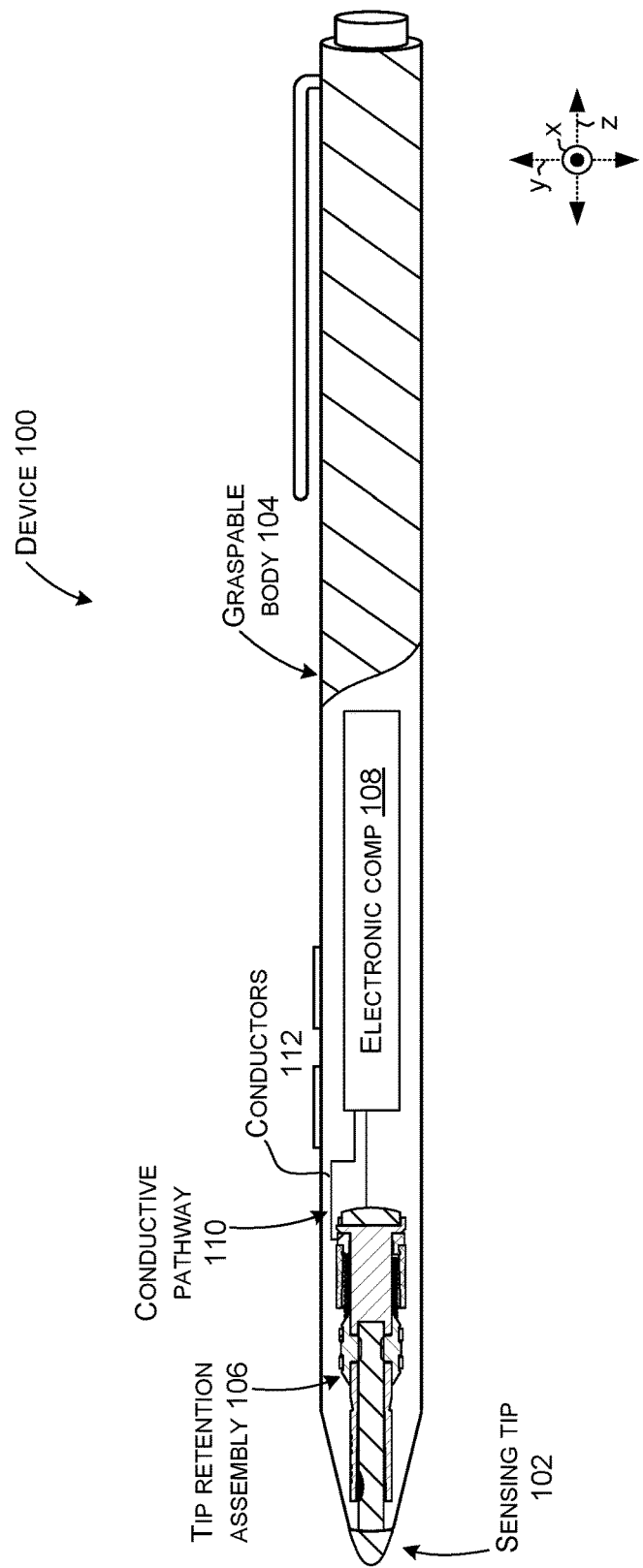
FIG. 1 is an elevational view of an example device in accordance with some implementations of the present concepts.

FIG. 1 shows a cut-away view of an example device 100. The device can include a sensing tip 102, a graspable body 104, and a tip retention assembly 106. The tip retention assembly 106 can physically retain the sensing tip 102 relative to the graspable body 104 until removed by a user. The tip retention assembly 106 can also electrically couple the sensing tip 102 to an electronic component 108 positioned in the graspable body 104 along a conductive or electrical pathway 110. A portion of the conductive pathway 110 can be provided by the tip retention assembly 106 and another portion can be provided by conductors 112 extending between the tip retention assembly and the electronic components 108.

Figures 2A, 2B, 2C:
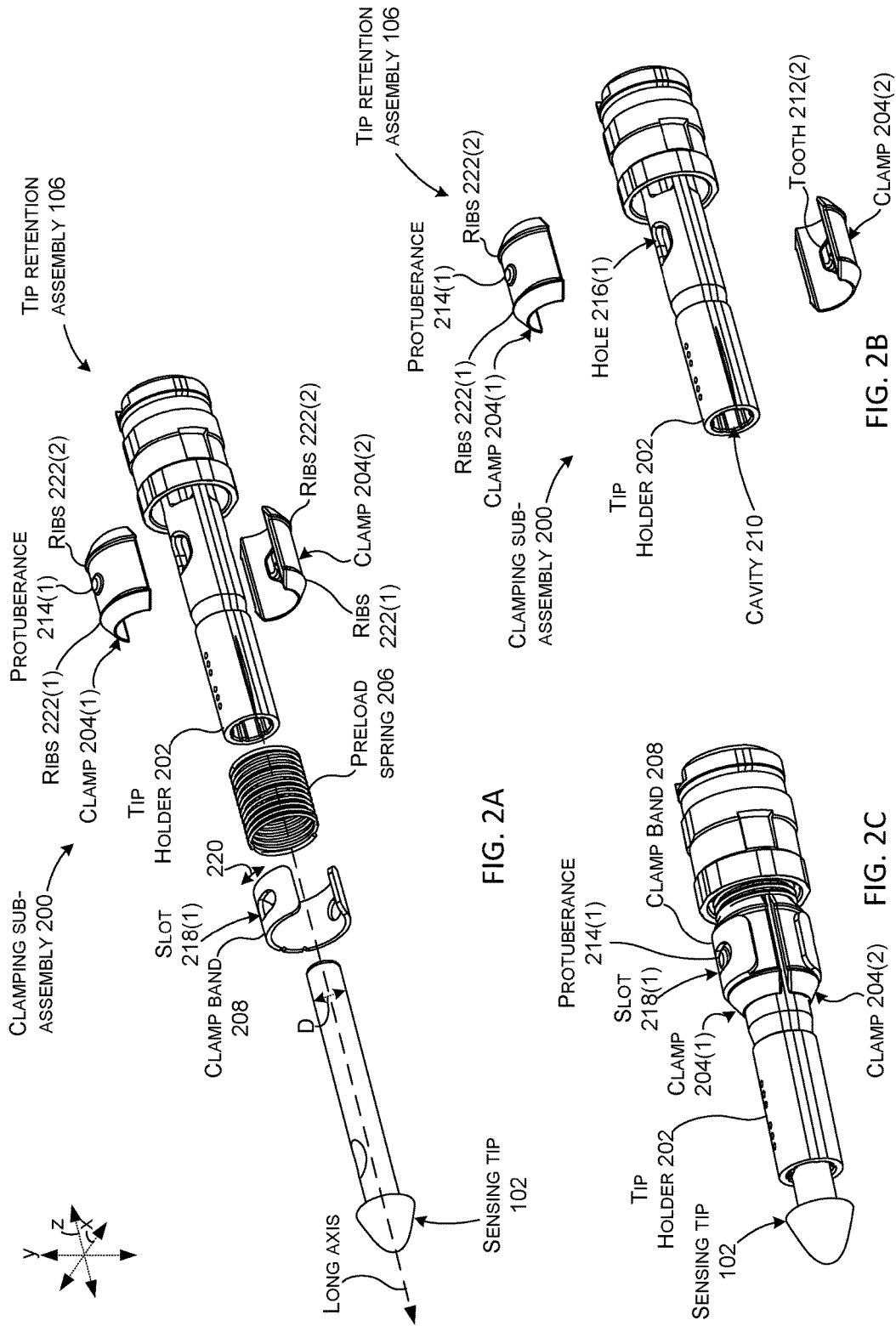
FIG. 2C is a perspective view of a tip retention assembly example in accordance with some implementations of the present concepts.
FIGS. 2A, 2B, and 3 are exploded perspective views of a tip retention assembly example in accordance with some implementations of the present concepts.

FIGS. 2A-2C collectively show features of the tip retention assembly 106. In this case, the tip retention assembly 106 can include a clamping sub-assembly 200. The clamping sub-assembly can include a tip holder 202, first and second clamps 204(1) and 204(2), a preload spring 206, and/or a clamp band 208. The tip holder 202 can define a cavity 210. The sensing tip 102 and the cavity 210 can be elongate (e.g., extend along a long axis). The user can insert sensing tip 102 into cavity 210.

The clamps 204 can include an inwardly facing tooth 212 and an outwardly facing protuberance 214 (e.g., they extend in opposite directions from the clamp). (In the drawing, the protuberance 214(1) of clamp 204(1) is visible and the tooth 212(2) of clamp 204(2) is visible.) The teeth 212 can extend through holes 216 in the tip holder 202 into the cavity 210. The protuberances 214 can extend into slots 218 in the clamp band 208. The slots can be elongated radially as indicated at 220 to accommodate expansion of the clamp band upon insertion of the sensing tip 102, which can force the clamps slightly away from one another. The slots 218 allow slight relative radial movement between the clamps 204 and the clamp band 208 while preventing relative movement in the z-reference direction. The z-reference direction relative movement can be limited/prevented by the width of the protuberance in the z-reference direction matching a width of the slots in the z-reference direction. Alternatively or additionally, the z-reference direction relative movement can be limited/prevented by ribs 222. The ribs 222(1) and 222(2) can be spaced apart a distance equal to a width of the clamp band in the z-reference direction (e.g., the clamp band lies between and is retained by the ribs).

Stated another way, the clamp band 208 can be preloaded to force the clamps 204 and hence the teeth 212 toward one another until a distance between the teeth is less than an outside diameter D of the sensing tip 102 that is inserted into the cavity 210. Insertion of the sensing tip can force the teeth 212 apart, which opens the clamps 204 and the clamp band 208. As such, the clamp band applies inward spring pressure to retain the sensing tip in the tip holder 202.

Figure 3:
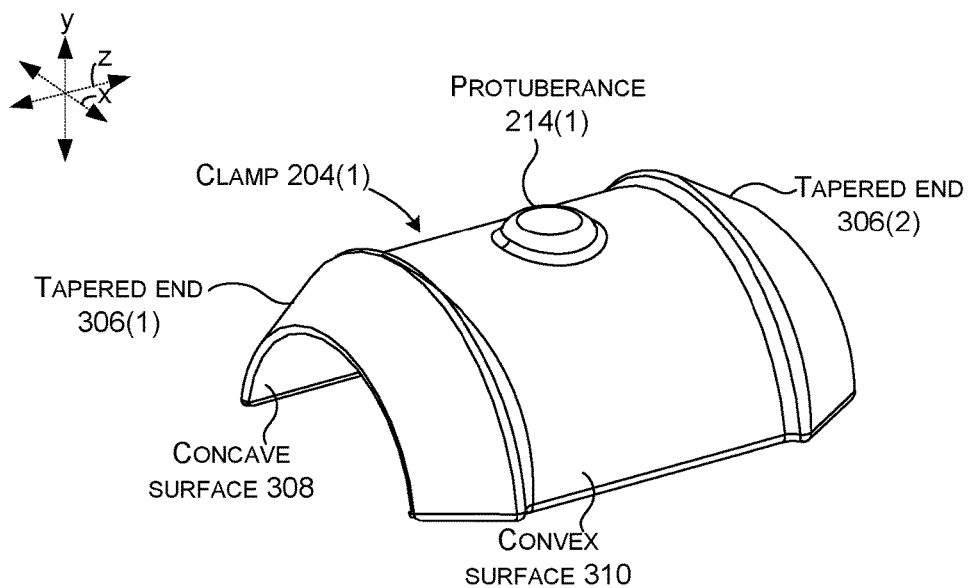
Figure 3:
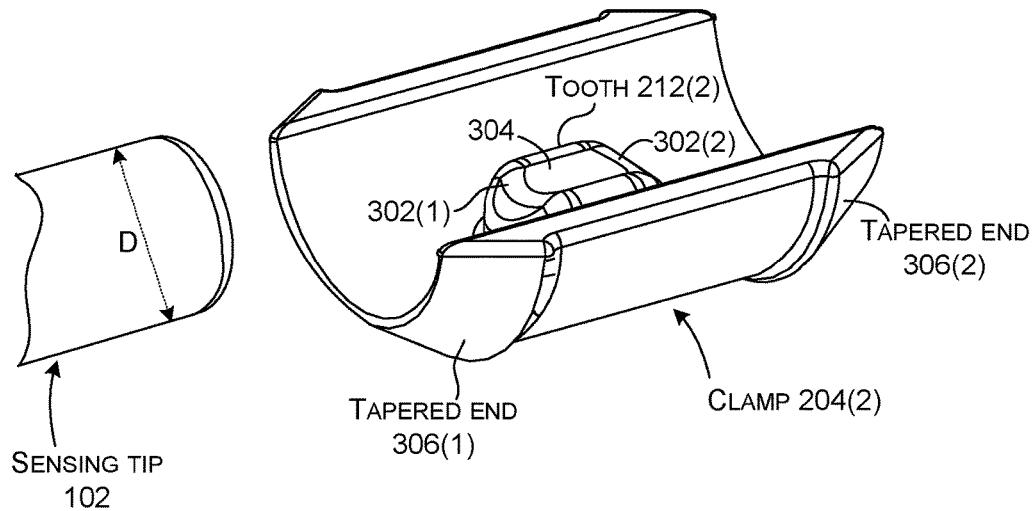

FIG. 3 shows additional details of clamps 204. In this implementation, the clamps 204(1) and 204(2) are identical to one another. The clamps are also symmetrical when bisected orthogonally to the z-reference axis (e.g., the clamps can be swapped top-for-bottom and/or end-for-end). Thus, this design is economical in that fewer different pieces are manufactured. Further, the pieces cannot be assembled incorrectly since both clamps are the same and both ends of each clamp are the same.

In the illustrated configuration, the teeth 212 have ramped or tapered ends 302(1) and 302(2). Recall that as mentioned above relative to FIGS. 2A-2C, the clamp band (208, FIG. 2A) can bias the teeth toward one another so that the distance between them is smaller than the diameter D of the sensing tip 102. (This distance between the teeth is designated as $W_1$ in FIG. 4A). The ramped ends 302 can facilitate insertion of the sensing tip between the teeth by gradually forcing the teeth apart against the force of the clamp band. In this case, an inner facing surface 304 of the tooth that extends between the two ramped ends 302 is concave (radially to the z-reference axis) to match the outside profile of the sensing tip 102 (e.g., the tooth is saddle-shaped to cradle the sensing tip). This saddle-shaped configuration can increase the contact interface between the sensing tip 102 and the tooth 212 to promote effective electrical conduction between the sensing tip 102 and the clamps 204. Other configurations can employ other geometries. For instance, the tooth could be flat where it contacts the sensing tip rather than curved.

In this case, the clamps 204 also have ends 306(1) and 306(2) that are ramped or tapered. The tapered ends 306 can ensure that the preload spring (206, FIG. 2A) rides up onto the tapered ends of the clamps rather than jamming underneath the clamps (e.g., between the clamps and the tip holder 202).

From one perspective, the clamps 204 can be characterized as collectively approximating an open-ended barrel that has an inner concave surface 308 and an outer convex surface 310. In the illustrated configuration, clamp 204(1) spans 180 degrees and clamp 204(2) spans 180 degrees to collectively complete a barrel shape. In another implementation, three clamps that each span 120 degrees could be combined to collectively create the barrel shape around the tip holder 202. Another implementation can employ four or more clamps to collectively form the barrel shape.

FIGS. 4A and 4B show sectional views of tip retention assembly 106. FIG. 4A shows the sensing tip 102 partially inserted into tip holder 202, but not yet engaging teeth 212. FIG. 4B shows the sensing tip 102 engaging teeth 212. FIGS. 4A and 4B collectively show how the tip retention assembly 106 can physically provide a conductive pathway to electrically couple the sensing tip to electronic components (108, FIG. 1). FIGS. 4A and 4B show several elements that are introduced above and which are not re-introduced here.

FIG. 4A shows clamp band 208 biasing the teeth 212 toward one another to a distance $W_1$, which is less than diameter D of the sensing tip 102. FIG. 4B shows subsequent insertion of the sensing tip partially overcomes the bias of the clamp band 208 and forces the teeth apart to a distance $W_2$ that approximates diameter D of the sensing tip. This configuration physically retains the sensing tip 102 in the tip holder 202 with an amount of force that remains generally constant through repeated insertion removal cycles. Further, the physical contact between the teeth 212 and the sensing tip 102 provides a low resistance electrical interface between the sensing tip and the clamps 204. In this case, the sensing tip 102 can make electrical contact with the clamps 204. The clamps make electrical contact with the preload spring 206 which is compressed between the clamps and a conductive retainer 402 of the tip holder 202. The conductive retainer 402 can be electrically connected to conductors which are in turn connected to electronic components (see FIG. 1).

Thus, despite the clamps 204 being positioned outside of the tip holder 202, the teeth 212 can extend through the tip holder and can be forced inwardly against the sensing tip 102 by the clamp band 208 to mechanically retain the sensing tip and to electrically connect the sensing tip to an electronic component positioned in the graspable body (see FIG. 1).

As mentioned above, the tip retention assembly 106 can contribute to electrically connecting the sensing tip 102 to electronic components of the device 100 (see FIG. 1). In this case, the electrical connection is achieved along a conductive pathway (110, FIG. 1) starting at the sensing tip 102 and progressing to the clamps 204, then the preload spring 206, and then into the conductive retainer 402. Conductors (112, FIG. 1) can connect the conductive retainer to the electronic components (108, FIG. 1). The sensing tip is forceably contacted by the clamps 204 to promote efficient conduction (e.g., low resistance) between the sensing tip and the clamps. Similarly, preload spring 206 is compressed between clamps 204 and conductive retainer 402 to promote efficient conduction between these elements.

Note that additional conductive pathways (110, FIG. 1) could be formed between the electronic components (108, FIG. 1) and the sensing tip 102. For instance, another set of clamps 204 and clamp band 208 (e.g., third and fourth clamps and another clamp band) can be spaced apart in the z-reference direction from the illustrated set (e.g., spaced axially away from the first and second clamps) to create a second electrical contact with the sensing tip that is isolated from the first conductive path. For instance, the sensing tip can obtain two types of sensed data and have two conductive regions, and each type of sensed data can be communicated over a dedicated electrical path from an individual conductive region into an individual set of clamps.

In this example, the sensing tip 102, clamps 204, preload spring 206, and conductive retainer 402 can be formed from electrically conductive materials and/or be coated with an electrically conductive material. For instance, these elements could be metal or plastic with a metal or other conductive coating. Other elements, such as the tip holder 202, can be electrically insulative to isolate the conductive pathway. For example, the tip holder can be formed from plastic. The preload spring 206 and the clamp band 208 can be formed from materials that tend to retain uniform spring properties for extended periods/cycles. For instance, the preload spring and clamp band can be formed from steel, among others. The elements can be formed utilizing various techniques, such as molding, machining, and/or 3D printing.

Various examples are described above. Additional examples are described below. One example includes a device comprising a graspable body containing an electronic component, a sensing tip, and a tip retention assembly fixed relative to the body and physically removeably retaining the sensing tip and electrically coupling the sensing tip and the electronic component. The tip retention assembly comprises a tip holder that defines a cavity that receives the sensing tip and further comprises first and second clamps positioned radially around the tip holder and extending through holes in the tip holder into the cavity to contact the sensing tip. The tip retention assembly further comprises a clamp band positioned around the first and second clamps and biasing the first and second clamps inwardly toward the sensing tip.

Another example can include any of the above and/or below examples where the first and second clamps each span 180 degrees around the tip holder.

Another example can include any of the above and/or below examples where the first and second clamps are geometrically identical to one another.

Another example can include any of the above and/or below examples where the sensing tip extends along a long axis and wherein individual clamps are symmetrical when bisected transverse to the long axis.

Another example can include any of the above and/or below examples where the device further comprises a third clamp and where the first, second, and third clamps each span 120 degrees around the tip holder.

Another example can include any of the above and/or below examples where the first and second clamps each include an inwardly facing tooth that extends through an individual hole to engage the sensing tip.

Another example can include any of the above and/or below examples where the tooth comprises an inwardly facing surface having a shape that corresponds to an outwardly facing shape of the sensing tip.

Another example can include any of the above and/or below examples where the first and second clamps each include a protuberance that extends in an opposite direction from the tooth.

Another example can include any of the above and/or below examples where individual protuberances extend into radially elongated slots in the clamp band.

Another example can include any of the above and/or below examples where the first and second clamps include tapered ends.

Another example can include any of the above and/or below examples where the device comprises a preload spring that is retained by the tip holder and biased against the tapered ends.

Another example can include any of the above and/or below examples where the device further comprises third and fourth clamps positioned radially around the tip holder and spaced axially away from the first and second clamps, and another clamp band positioned around the third and fourth clamps and biasing the first and second clamps inwardly toward the sensing tip.

Another example can include any of the above and/or below examples where the first and second clamps and the clamp band comprise a portion of a first electrical pathway between the sensing tip and the electronic component, and the third and fourth clamps and the another clamp band comprise a portion of a second different electrical pathway between the sensing tip and the electronic component.

Another example can include a device comprising a sensing tip, a tip holder that defines a cavity that receives the sensing tip, and first and second clamps positioned radially around the tip holder and extending through holes in the tip holder into the cavity to contact the sensing tip. The device further comprises a flexible clamp band positioned around the first and second clamps and biasing the first and second clamps inwardly against the sensing tip.

Another example can include any of the above and/or below examples where prior to insertion of the sensing tip in the tip holder, a distance between the first and second clamps within the cavity is less than an outside diameter of the sensing tip that contacts the first and second clamps.

Another example can include any of the above and/or below examples where the first and second clamps approximate a portion of a barrel with opposing inwardly facing concave surfaces and outwardly facing convex surfaces.

Another example can include any of the above and/or below examples where the device further comprises an inwardly facing tooth on the concave surface and an outwardly facing protuberance on the convex surface.

Another example can include any of the above and/or below examples where the inwardly facing tooth has a flat engagement surface for contacting the sensing tip.

Another example can include any of the above and/or below examples where the inwardly facing protuberance is saddle-shaped and has a concave engagement surface for contacting the sensing tip.

Another example can include a device comprising a graspable body containing an electronic component, a tip holder positioned relative to the graspable body that defines a cavity that receives a sensing tip, and a clamping sub-assembly positioned outside of the tip holder and extending through the tip holder to apply a force to the sensing tip to mechanically retain the sensing tip and to electrically connect the sensing tip to an electronic component positioned in the graspable body.

Although techniques, methods, devices, systems, etc., pertaining to sensing tip retention are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc. Also, as used herein, 'including' means 'including but not limited to,' 'based on' means 'based at least in part on,' and 'a' means 'one or more.' Also, if interpretation under Section 112 6/f is intended the phrase 'means' or 'step' will be employed. Lacking one of these two explicit recitations, Section 112 6/f is not intended to be invoked.

The invention claimed is:

1. A device, comprising:
   a graspable body containing an electronic component;
   a sensing tip; and,
   a tip retention assembly fixed relative to the graspable body and physically removeably retaining the sensing tip and electrically coupling the sensing tip and the electronic component, the tip retention assembly comprising:
   a tip holder that defines a cavity that receives the sensing tip;
   first and second clamps positioned radially around the tip holder and extending through holes in the tip holder into the cavity to contact the sensing tip; and,
   a clamp band positioned over the first and second clamps and biasing the first and second clamps inwardly toward the sensing tip.

2. The device of claim 1, wherein the first and second clamps each span 180 degrees around the tip holder.

3. The device of claim 1, wherein the first and second clamps are geometrically identical to one another.

4. The device of claim 1, wherein the sensing tip extends along a long axis and wherein individual clamps are symmetrical when bisected transverse to the long axis.

5. The device of claim 1, further comprising a third clamp and wherein the first, second, and third clamps each span 120 degrees around the tip holder.

6. The device of claim 1, wherein the first and second clamps each include an inwardly facing tooth that extends through an individual hole to engage the sensing tip.

7. The device of claim 6, wherein the tooth comprises an inwardly facing surface having a shape that corresponds to an outwardly facing shape of the sensing tip.

8. The device of claim 6, wherein the first and second clamps each include a protuberance that extends in an opposite direction from the tooth.

9. The device of claim 8, wherein individual protuberances extend into radially elongated slots in the clamp band.

10. The device of claim 1, wherein the first and second clamps include tapered ends.

11. The device of claim 10, further comprising a preload spring that is retained by the tip holder and biased against the tapered ends.

12. The device of claim 1, further comprising third and fourth clamps positioned radially around the tip holder and spaced axially away from the first and second clamps, and another clamp band positioned over the third and fourth clamps and biasing the third and fourth clamps inwardly toward the sensing tip.

13. The device of claim 12, wherein the first and second clamps and the clamp band comprise a portion of a first electrical pathway between the sensing tip and the electronic component and the third and fourth clamps and the another clamp band comprise a portion of a second different electrical pathway between the sensing tip and the electronic component.

14. A device, comprising:
   a sensing tip;
   a tip holder that defines a cavity that receives the sensing tip;

first and second clamps positioned radially around the tip holder and extending through holes in the tip holder into the cavity to contact the sensing tip; and, a flexible clamp band positioned over the first and second clamps and biasing the first and second clamps inwardly against the sensing tip.

15. The device of claim 14, wherein prior to insertion of the sensing tip in the tip holder, a distance between the first and second clamps within the cavity is less than an outside diameter of the sensing tip that contacts the first and second clamps.

16. The device of claim 14, wherein the first and second clamps approximate a portion of a barrel with opposing inwardly facing concave surfaces and outwardly facing convex surfaces.

17. The device of claim 16, further comprising an inwardly facing tooth on the concave surfaces and an outwardly facing protuberance on the convex surfaces.

18. The device of claim 17, wherein the inwardly facing tooth has a flat engagement surface for contacting the sensing tip.

19. The device of claim 17, wherein the inwardly facing tooth is saddle-shaped and has a concave engagement surface for contacting the sensing tip.

20. A device, comprising:

a graspable body containing an electronic component;

a tip holder positioned relative to the graspable body that defines a cavity that receives a sensing tip; and, a clamping sub-assembly positioned outside of the tip holder and extending through the tip holder to apply a force to the sensing tip to mechanically retain the sensing tip with a contact element that contacts the sensing tip and a biasing element positioned over the contact element and that biases the contact element against the sensing tip, the clamping sub-assembly also electrically connecting the sensing tip to an electronic component positioned in the graspable body.

* * * * *